No. 786,457. PATENTED APR. 4, 1905.
F. McGINNIS.
SPECULUM.
APPLICATION FILED APR. 29, 1904.
2 SHEETS—SHEET 1.
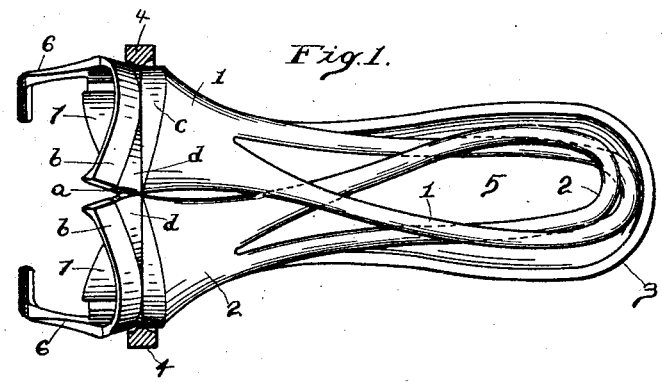
Fig. 1.
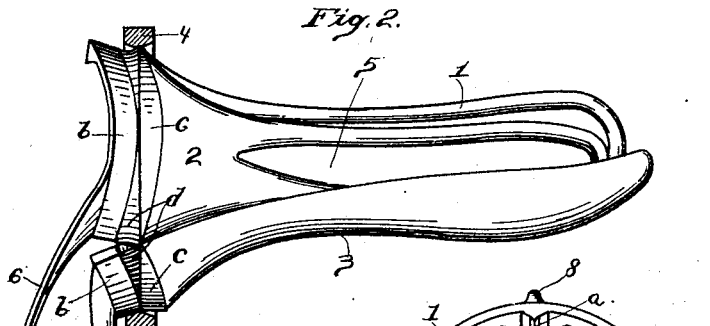
Fig. 2.
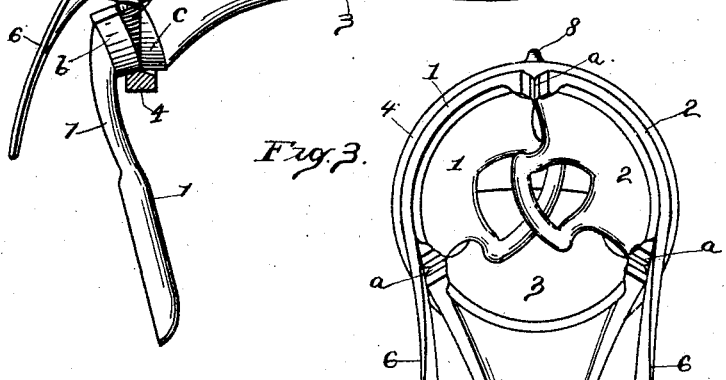
Fig. 3.
Fig. 4.
WITNESSES:
R. E. Hamilton.
W. G. Lingle.
INVENTOR,
Frank McGinnis.
By Higdon & Higdon.
Attys.

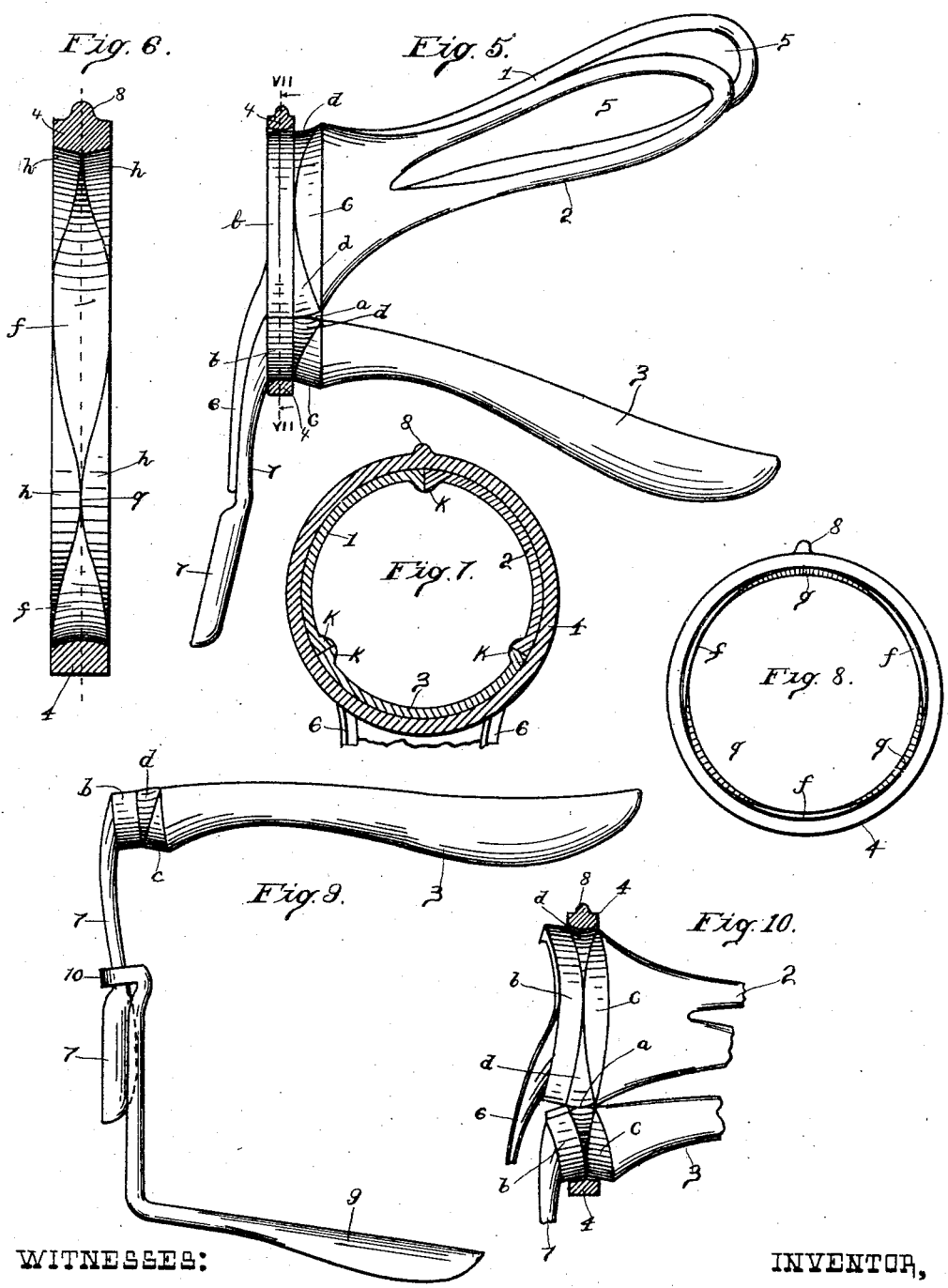

No. 786,457.　　　　　　　　　　　　　　　　　　　　Patented April 4, 1905.

UNITED STATES PATENT OFFICE.

FRANK McGINNIS, OF HIGGINSVILLE, MISSOURI.

SPECULUM.

SPECIFICATION forming part of Letters Patent No. 786,457, dated April 4, 1905.

Application filed April 29, 1904. Serial No. 205,474.

*To all whom it may concern:*

Be it known that I, FRANK MCGINNIS, a citizen of the United States, residing at Higginsville, in the county of Lafayette and State of Missouri, have invented new and useful Improvements in Specula, of which the following is a specification.

My invention relates to vaginal specula; and the object of my invention is to produce an instrument of this kind which may be easily and expeditiously rendered aseptic and which when in use is not cumbersome and is possessed of the highest surgical and sanitary qualifications.

Other advantages of my invention will be pointed out hereinafter.

Referring now to the accompanying drawings, in which corresponding figures and letters indicate corresponding parts throughout, Figure 1 is a top view of a speculum constructed in accordance with my invention, the clamping-ring being shown in section and the leaves in closed position. Fig. 2 is a side elevation of the same, the clamping-ring being shown in section. Fig. 3 is an elevation of the speculum, looking in the direction of the arrow in Fig. 2. Fig. 4 is a detail section taken on line IV IV of Fig. 3. Fig. 5 is a side elevation showing the leaves in fully-opened position, the clamping-ring being shown in section. Fig. 6 is an enlarged diametrical section of the clamping-ring. Fig. 7 is a section taken on line VII VII of Fig. 5, the shanks being broken off. Fig. 8 is an elevational view of the ring detached. Fig. 9 is a side elevation of the lower leaf with its shank and an auxiliary handle attached to the latter. Fig. 10 is a view similar to Fig. 2, showing the surfaces engaged by the ring, the leaves (broken away) partly separated, and the ring (in section) in a position for locking the parts in adjusted position.

The speculum is composed of three interfolding leaves 1, 2, and 3, held together by an adjustable ring 4. The mode of engagement of said ring will be described hereinafter. The three leaves 1, 2, and 3 are of different lengths, as most clearly shown in Fig. 1, leaf 2 being the shortest, leaf 1 the next longer, and leaf 3 being the longest. The obvious purpose of this variation in length is to permit the leaves to fold closely together when in closed position. In fact, the short leaf passes partly through the intermediate leaf and the long leaf fits closely around them both, as shown. The superior leaves 1 and 2 are provided with openings or windows 5 for visual purposes; but the remaining leaf, which lies underneath when in use, is left solid, so as to form a drain for fluids during certain surgical operations. The rearward portion of each leaf is shaped in the general form of a one-hundred-and-twenty-degree segment of a cylinder, as most clearly shown in Fig. 7. Each of these segmental portions is provided with two convex surfaces $a$, (see Figs. 5 and 10,) by means of which the leaves are capable of a rocking movement relatively when their angles of opening are changed. For coöperation with the clamping-ring 4 the outer surface of the said segmental portion of each leaf is formed with three different surfaces, (designated, respectively, $b$, $c$, and $d$.) Surfaces $b$, nearest the operator, when in contact, as shown in Fig. 5, form a continuous cylindrical surface. Surfaces $c$, farthest from the operator, when in contact, as shown in Fig. 1, form a practically-continuous cylindrical surface, though only the pointed ends of the surfaces $c$ are in contact. Between each pair of surfaces $b$ and $c$ are two triangular surfaces $d$, which are somewhat concaved, as shown in Figs. 5 and 10.

The clamping-ring 4 has a circular periphery; but its inner wall is peculiarly formed for coöperation with the aforesaid surfaces of the leaves. The inner periphery of this ring along its center line (which is the dotted line in Fig. 6) is a circle. This circular surface is divided into three pointed lobes $f$, as it is contracted at three points one hundred and twenty degrees apart to mere edges $g$. These edges form obtuse angles, as shown in Figs. 2 and 6. The inclined surfaces which form these angles are designated $h$. The surface transversely of each lobe $f$ is slightly convex, as shown in section of the bottom of the ring in Fig. 6, and the section at the top of the ring is taken on a line placed half-way between two of the lobes *f*. The ring may be slipped into position or removed from the leaves either over the leaves or in the opposite direction.

Each of the superior leaves 1 and 2 is provided with an integral handle 6, and the lower leaf 3 has an integral handle or shank 7 7, which also forms a drain, Figs. 2, 3, and 4. By manipulating the handles 6 the leaves 1 and 2 may be opened or closed to any desired position. Their adjustments may be made independently, and the adjustments of the lower leaf 3 are independent of the other leaves. Moreover, while the speculum is in use any one or two of the leaves may be removed from the patient without closing them together, thus enabling the operator to pack the vagina with a full view of the field of operation and without disturbing the dressing or tampon.

The clamping-ring is provided with a marker or indicator, such as the knob 8, which indicates to the operator the position in which the ring is turned. When the ring is in such a position that its three edges *g* rest in the angles formed by surfaces *b c* of the leaves 1, 2, and 3, the leaves may be epened until the three surfaces *b* form a continuous cylinder. At any point in this rocking motion of the leaf or leaves they may be locked in position by rotating the ring sixty degrees or less, when its lobe-surfaces *f* will jam or bind upon and between the segmental surfaces *b* and *c* of the leaves.

Opening the speculum is effected by moving the levers or handles 6 toward the shank 7 and at the same time slipping the ring from surfaces *c* to surfaces *b*. The rear portions of surfaces *b* of the superior leaves 1 and 2 are slightly beveled to allow for pulling the ring off of the leaves toward the operator, thus releasing the latter, which may be removed separately, if so desired. (See Fig. 5.)

A rubber tube may be connected to the drain 7 to carry off the fluid.

The superior leaves by interfolding as they do may be made broader than those of the ordinary speculum, thus permitting a more extended view of the field.

As there are no screws or rivets, no cracks, or opposed surfaces which cannot be entirely separated in this speculum, it is obvious that it can be readily and thoroughly cleaned and sterilized.

I can construct my speculum of any suitable material or the various parts of the invention of different kinds of material, such as experience may demand in practice.

The metal forming the rocking surfaces *a* should be thickened, as shown at *k* in Fig. 7. The looped portions of the superior leaves should be approximately round in section to provide the necessary strength.

As shown in Fig. 9, an auxiliary handle 9 may be attached to the shank 7. The handle for this purpose is provided with an eye 10, sufficiently large to pass over the enlarged terminal portion 7 of the shank and is held in position by its own weight and the gutter-shaped form of the shank which embraces 7. This enables the operator to exert an extra downward and lateral pressure upon the speculum when such is necessary.

I have described only the preferred form of my invention; but various immaterial modifications might be made without departing from the spirit and scope thereof. Hence I do not wish to limit myself to the precise details shown.

Having thus described my invention, what I claim as new, and desire to secure by Letters Patent of the United States, is—

1. In a speculum of the character described, three interfolding leaves of different lengths, the two superior leaves having a loop formation, and a clamping-ring which is provided with three inwardly-projecting pointed lobes, the inner faces of said lobes forming arcs of a circle, substantially as described.

2. In a speculum, three interfolding leaves of different lengths, the two superior leaves each being provided with a depending handle, and the lower leaf having a spoon formation and being provided with a depending member which serves the three purposes of handle, drain, and shank for attachment of an auxiliary handle, substantially as described.

3. In a speculum, three interfolding leaves, the rearward portions of which have a segmental formation, the segmental portion of each leaf having outer rearward faces *b*, outer forward faces *c*, and intermediate triangular faces *d*, and also having rocking contact-faces *a*, in combination with a clamping-ring which is provided with three inwardly-projecting pointed lobes, the inner faces of said lobes together forming a circle, and said ring being adapted to embrace the segmental portions of the leaves and to hold the leaves in any desired position by rotating the ring, substantially as described.

4. In a speculum, three interfolding leaves, the rearward portion of each leaf being segmental in form, each segmental portion having two rocking surfaces *a*, adapted to form bearings between the leaves, and having two relatively inclined segmental faces *b* and *c*, in combination with a clamping-ring which is adapted to loosely engage either the faces *b* or the faces *c*, and the inner face of said ring having means for tightly engaging all of said faces when the ring is rotated, substantially as described.

5. In a speculum, three interfolding leaves, the rearward portion of each being segmental in form, the three together forming a ring, each segmental portion having outer rearward faces *b* and outer forward faces *c*, in combination with an annular clamping member which is adapted to loosely engage either the faces $b$ or the faces $c$, according to whether the leaves are in open or in closed position, and the inner face of said ring being divided into three lobes which are adapted to tightly engage all of the said faces when the ring is rotated, substantially as described.

In testimony whereof I affix my signature in the presence of two witnesses.

FRANK McGINNIS.

Witnesses:
V. J. KAISER,
H. N. ASBURY.